United States Patent [19]

VanderMey

[11] Patent Number: 4,946,320
[45] Date of Patent: Aug. 7, 1990

[54] ROUTING PROCEDURE

[76] Inventor: Dean T. VanderMey, 4684 60th, SW., Grandville, Mich. 49418

[21] Appl. No.: 199,810

[22] Filed: May 27, 1988

[51] Int. Cl.⁵ .............................................. B23Q 3/00
[52] U.S. Cl. ................................. 409/132; 408/1 R; 408/87
[58] Field of Search ............... 409/131, 132, 189, 197, 409/219; 408/1 R, 72 R, 87; 269/7, 21; 51/235

[56] References Cited

U.S. PATENT DOCUMENTS

| | | | |
|---|---|---|---|
| 3,074,392 | 1/1963 | Fisher | 408/1 R |
| 3,749,625 | 7/1973 | Berg | 409/131 |
| 4,005,635 | 2/1977 | Feldcamp | 409/132 |
| 4,518,288 | 5/1985 | Cilindro | 409/219 |
| 4,808,046 | 2/1989 | Pilkington et al. | 409/132 |

*Primary Examiner*—Daniel Howell
*Attorney, Agent, or Firm*—Waters, Morse & Harrington

[57] ABSTRACT

A metal work sheet is prepared for routing operations by securing it to a backing panel with a releasable contact adhesive. The coated panel is initially covered by a release sheet, which is removed prior to the placement of the metal work sheet. Areas isolated by the routing can be pulled free of the adhesive, and the remaining work sheet can also be removed without adhesive contamination of the metal parts.

2 Claims, 1 Drawing Sheet

ROUTING PROCEDURE

BACKGROUND OF THE INVENTION

It has become common practice to cut thin sheets of aluminum into various patterns with the use of a routing machine. Such machines were formerly limited to working on softer materials, such as wood, plastics, and other synthetics. Advances in metallurgy now make it possible for routing bits to be able to engage the softer metals for extended periods of time without losing their cutting edges. This technique has become widely used in the manufacture of signs, where large panels have to be cut out into predetermined patterns according to custom specifications. Large computer-controlled routing machines are easily capable of handling panels 4'×8', and larger. Once the desired pattern of cutout areas has been introduced into the computer control, the machine proceeds to complete the job automatically.

Where the router isolates a particular area on the work sheet to produce an "island", the rotation of the router bit has a tendency to bite into the material that is almost fully isolated, and flip it out of position. This usually also results in a distortion of the adjacent metal areas. It has been common practice to mount the aluminum work sheets on a backing panel of some relatively inexpensive material, and to attempt to secure the aluminum to the backing material with enough security that the isolated areas of the sheet metal are held with sufficient firmness for the router to continue its operations as these particular areas are isolated. The presence of the backing panel, incidentally, also tends to minimize the formation of a cutting burr on the underside of the work sheet.

Attempts have been made to secure the aluminum work sheet to the backing panel with some form of adhesive effect, and double-coated adhesive tape has been used for this purpose. Essentially, such tape has a plastic base, with adhesive on both sides. One side is stuck to the backing panel, and the other is prepared to receive the aluminum work sheet. It should be noted that this arrangement slightly elevates the aluminum work sheet out of engagement with the backing panel in the areas where the tape has been applied. This is undesirable. Another problem has been the result of the engagement of the router bit rotating at high speed as it goes through a taped area. The heat generated by the cutting action tends to melt the plastic material of the tape, and to gum up the router bit to the point where the cutting action is interfered with. Very extensive cleanup time is characteristically associated with this type of routing procedure.

SUMMARY OF THE INVENTION

A metal work sheet is prepared for routing operations by coating a backing panel with a releasing adhesive preferably followed by applying a release sheet after the adhesive has solidified. The release sheet is then removed, and the metal work sheet placed in full engagement with the adhesive. Routing is then begun, with the router bit traversing the metal work sheet, and going approximately half way into the backing panel. Isolated areas from the work sheet are then easily pulled free of the adhesive. The entire metal work sheet can also be pulled free quite easily, where the interest is in the work sheet with cutout areas, rather than in the parts produced by the isolation from the routing operations. In both cases, the use of the contact adhesive avoids any fouling of the metal pieces with the adhesive material.

DESCRIPTION OF THE PREFERRED EMBODIMENT

Figure 1:
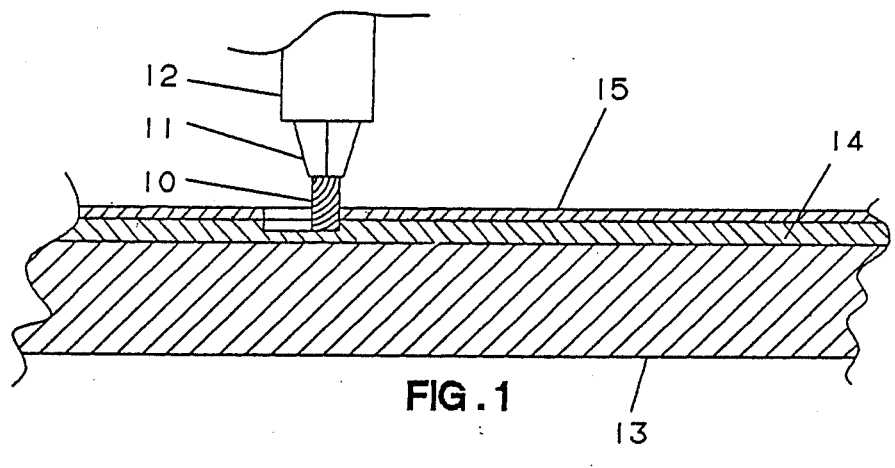
FIG. 1 is a fragmentary sectional elevation showing the beginning of a routing operation.
Figure 2:
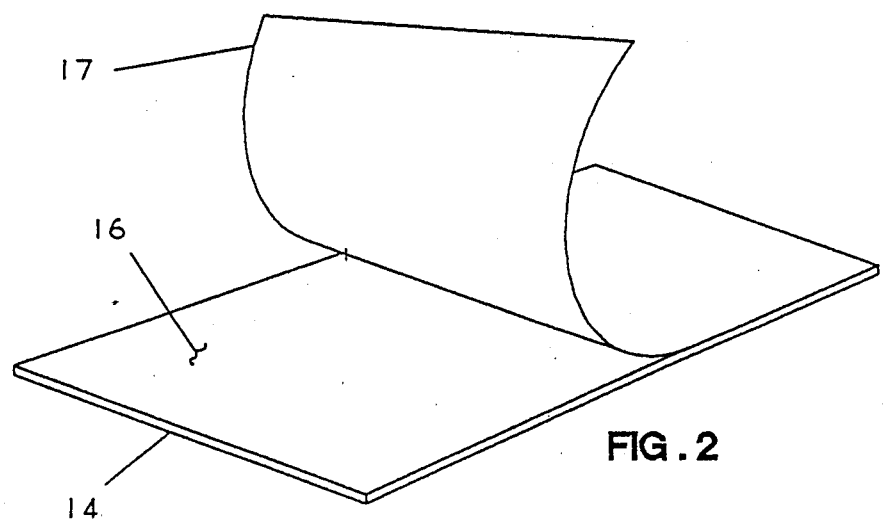
FIG. 2 is a perspective view showing a backing panel in conjunction with a release sheet.

Referring to the drawings, a conventional router bit 10 is shown carried by a collet 11 in the spindle 12 of a routing machine. The table 13 supports a composite laminate including a base panel 14 and a sheet of aluminum 15 secured to the base panel by a release adhesive. Referring to FIG. 2, the base panel 14 is commonly approximately 4'×8'×⅛" in thickness. As shown in FIG. 1, it is usual to adjust the action of a routing machine to traverse the aluminum work sheet 15, and enter about half way into the base panel 14. Since the base panel is normally scrapped after the routing operation has been completed, it is desirable to minimize its cost. A laminated paperboard of conventional composition has been found very effective for this purpose. The panel is prepared as shown in FIG. 2 by coating the top surface 16 with a release adhesive, preferably one identified commonly in the market as "H.B. Fuller J3885". After this material has been applied either by spray or wiping operations, it is solidified usually by drying. When the drying has been completed, a paper release sheet 17 is usually applied so that the panels can be stored conveniently one on top of the other without adhering. When a particular panel is withdrawn from storage for use in routing operations, all or a part of the release sheet 17 is peeled back so that the aluminum work sheet 15 can be set in its place. This is usually followed by the application of pressure, either by distributed weights, or by the use of a roller. The objective is to simply assure a firm and uniform engagement of the aluminum work sheet with the contact adhesive. When this has been done, the composite laminate is then placed on the table 13 of the router, and held in position by conventional clamps (not shown). The control system of the router is then activated, and the predetermined cutting pattern is executed.

Figure 3:
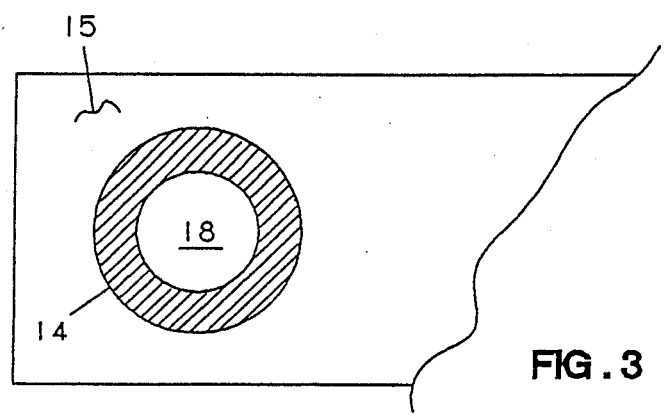
FIG. 3 is a fragmentary plan view showing a typical routed area that isolates a portion of the work sheet.

During such cutting operations, a situation such as is shown in FIG. 3 is frequently encountered. An area such as is indicated at 18 is isolated to form an island, and the router bit is then elevated out of engagement with the work sheet and moved automatically by the machine to the next site of cutting. The effect of the contact adhesive is to hold the area 18 in position long enough for the rotating router bit to complete the isolation of that area without flipping the area 18, and damaging part of its periphery where the discontinuity of cutting action takes place. With the arrangement described above, this does not happen. When the cutting operation has been completed, the piece represented at 18 is easily picked off by hand, as is the remainder of the work sheet 15.

A number of adhesives have been experimented with unsuccessfully by applicant until the particular material identified above was tested successfully. Experiments have also shown that a release paper of a weight corresponding to approximately thirty (30) pounds per thousand square feet appears to be most effective.

I claim:

1. A process for routing patterns in sheet material, comprising:

coating a backing panel of laminated paperboard with a releasable adhesive, and solidifying said adhesive;

placing a work sheet on said adhesive;

routing said work sheet according to a predetermined pattern with a router bit traversing said work sheet and entering said panel; and removing at least island areas isolated by said router bit by pulling them free of said adhesive.

2. A process as defined in claim 1, wherein said panel is coated substantially uniformly over its surface, and said work sheet is removed in its entirety.

* * * * *